March 24, 1953     J. T. STONE     2,632,637
HUMIDIFYING DEVICE FOR INTERNAL-COMBUSTION ENGINES
Filed May 14, 1948
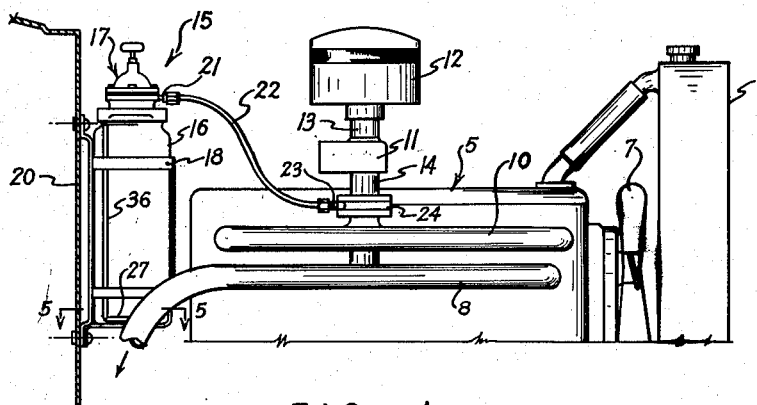
FIG.—1
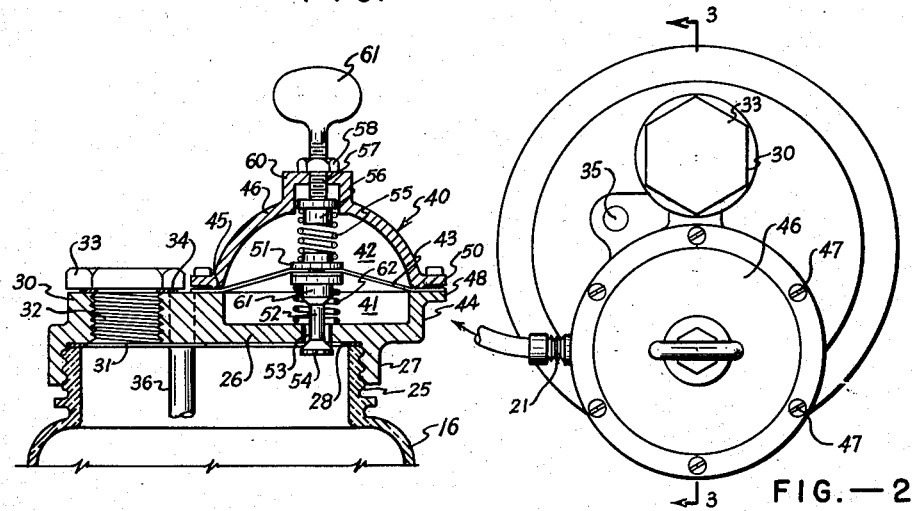
FIG.—3     FIG.—2
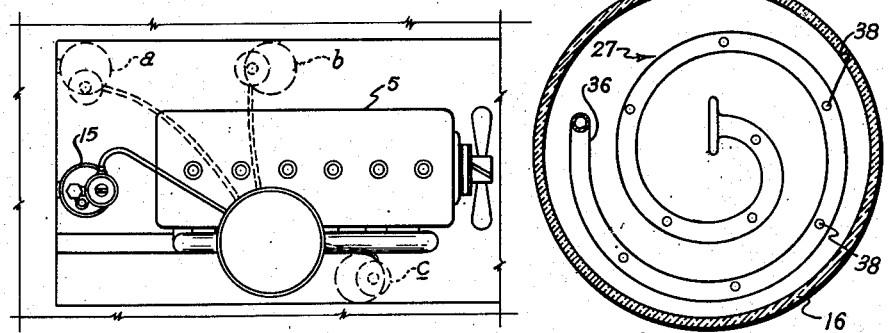
FIG.—4     FIG.—5
INVENTOR.
James T. Stone
BY
*H. O. McGrew*
ATTORNEY Patented Mar. 24, 1953

2,632,637

UNITED STATES PATENT OFFICE 2,632,637

HUMIDIFYING DEVICE FOR INTERNAL-COMBUSTION ENGINES

James T. Stone, Denver, Colo., assignor, by mesne assignments, to Zumbach Motor Repair Company, a corporation of New York Application May 14, 1948, Serial No. 27,064

4 Claims. (Cl. 261—65)

This invention relates, generally, to new and improved means for uniformly humidifying the fuel-air mixture drawn into the intake manifold of an internal combustion engine, particularly an automobile, truck or tractor type internal combustion gasoline engine.

It has been long known that the performance of internal combustion engines could be greatly improved in a number of respects by properly humidifying the fuel-air mixture drawn into the cylinders. In fact this phenomenon has been widely experienced by automobile operators when driving under high humidity conditions, such as in fog or heavy rain. Under these conditions automobiles have noticeably greater power and smoother operation. However, in addition to these directly noticeable improvements in performance, the following additional improvements attend proper and controlled humidification of the fuel-air mixture:

(a) Reduced pre-ignition
(b) Reduced carbon deposits
(c) Lower fuel costs (i. e. increased mileage)
(d) Longer engine life In fact advantage has previously been taken of this principle, specifically, in its application to military aircraft since World War II. In this particular case, the nature of the machine justified the relatively elaborate equipment required to control and regulate the admixture or injection of an appropriate amount of water for certain operating conditions. However, the additional expense involved in providing corresponding water-injection attachments for conventional automobile and truck motors has, generally, not been considered justified despite the known advantages and improvements to be gained.

The object of the present invention, generally stated, is the provision of relatively simple and inexpensive, yet highly effective and reliable, vacuum operated means for properly and uniformly humidifying the fuel-air mixture burned in automobile and truck type internal combustion engines, and the like.

Important specific objects of the invention include the provision of such humidifying means which may be readily adjusted or regulated with respect to the degree of vacuum required to bring the humidifier into action above idling speed and shut it off during periods of heavy load and which is constructed in such manner as to prevent the introduction of salts or sediment in the water into the engine.

Certain other objects of the invention, will in part be obvious, and will in part appear hereinafter.

For a more complete understanding of the nature and scope of the invention, reference may now be had to the following detailed description of the presently preferred embodiment thereof, reference being had to the accompanying drawings, wherein:

Fig. 1 is an elevational view showing the fuel-air mixture humidifier device attached to an automobile or truck engine;

Fig. 2 is an enlarged top plan view of the humidifier device shown in Fig. 1;

Fig. 3 is a sectional view taken on line 3—3 of Fig. 2, certain parts being shown in elevation;

Fig. 4 is a top plan view of the engine shown in Fig. 1 with the humidifier attached, and showing in broken line alternate positions in which the humidifier may be located; and Fig. 5 is an enlarged plan view of an aerator adapted to be disposed adjacent the bottom of the humidifier device shown in Fig. 1.

Referring to Fig. 1 of the drawings, a conventional type internal combustion engine 5 is shown, suitable for use in an automobile or truck. The engine 5 is provided with the usual auxiliary attachments and equipment, including: a radiator 6; a fan 7; an exhaust manifold 8; an intake manifold 10; a carburetor 11; and, an air filter 12. Air is drawn into the carburetor 11 through the inlet connection 13 upon which the air filter 12 is mounted. The fuel-air mixture outlet of the carburetor 11 is connected with the intake manifold 10 by means of a pipe or conduit section 14 or may be mounted directly on the manifold as desired. The carburetor may be of conventional design, incorporating a throttle, or butterfly valve below the fuel jets.

The vacuum-operated humidifier device of the present invention is indicated, generally, at 15 in Fig. 1. This device consists of a container 16 (e. g. a two quart Mason glass jar) provided with a cap or closure device 17 secured in air-tight relationship thereon. The humidifier may be supported in a carrier 18 which is bolted onto the front side of the rear wall 20 of the engine compartment.

The humidifier air outlet connection 21 of the humidifier 15 is connected by tubing 22 with the inlet connection 23 of an adapter or insert 24 disposed in the conduit section 14, the outlet of the adapter being in communication with the intake manifold 10 below the throttle valve of the carburetor.

Referring now to Figs. 2 and 3 for a more detailed description of the humidifier 15, it will be seen that in the particular construction shown the water container 16 has an externally threaded, wide mouth 25. It will of course be understood that other types of containers may be used. The closure device 17 includes a cover portion 26 which fits over the mouth 25 and is secured thereto in air-tight relationship by means of an internally threaded depending flange 27. Preferably, the air-tight joint between the cover 26 and the mouth 25 is perfected by means of a rubber gasket 28 compressed therebetween.

At one side, the cover portion 26 is provided with a raised portion 30 through which extends a threaded filling hole 31 provided with a closure plug 32 having a hex head 33. A ring gasket 34 is provided for the plug 32 and serves to tightly close the hole 31 so as to seal it against air leakage when a vacuum is applied to the container 16.

Adjacent to the threaded hole 31 there is provided an air inlet hole 35 (Fig. 2) which receives the upper end of a small diameter air tube 36 (Figs. 1 and 3) on the lower end of which is carried an aerator 27 (Figs. 1 and 5) in the form of a flat tubular coil having a plurality of air outlet openings 38—38 formed in the top thereof and disposed near the bottom of the container 16. I prefer to dispose the coil parallel to but spaced slightly above the bottom of the container 16, with the openings 38—38 formed in the top of the coil to permit sediment and precipitated salts to settle to the bottom without interference with the aerator. It has been found that nine to twelve holes 38—38, formed for example with a #54 drill, are adequate for the average size modern automobile motors, larger motors having greater cubic displacement requiring a proportionally greater number of openings 38—38 of greater diameter. If desired, the air inlet opening 35 could be provided with a needle valve (not shown).

For proper control and operation, the humidifier 15 should not function either while the engine 5 is idling (high manifold vacuum) or when it is working under very heavy loads (low manifold vacuum). In order to control the humidifier 15 so that it is automatically shut off during these periods, yet automatically operates at other times, the closure device 17 includes an adjustable, diaphragm type valve 40, having a lower chamber 41 and an upper chamber 42, separated by a flexible diaphragm 43. The periphery of the diaphragm 43 is compressibly secured between the top edge of a cylindrical flange 44 formed on the cover portion 26 and the rounded annular shoulder 45 formed on the bottom of a cap 46. A plurality of stud bolts 47—47 secure together the annular flanges 48 and 50, respectively, of the flange 44 and the cap 46.

At its center the diaphragm 43 is provided with two part button 51 (Fig. 3) fastened thereto in air-tight relationship. The lower side of the button 51 carries a depending valve stem 52 which extends through a valve port 53 communicating between the lower or vacuum chamber 41 and the interior of the container 16. The port 53 is shaped to mate with a lower valve 54 and an upper valve 61 mounted in spaced relation on the stem 52. A compression spring 62, telescoped over the stem 52 between the lower half of the button 51 and the cover portion 26 urges the valve 54 towards closed position, and is opposed by a compression spring 55 disposed between the upper half of the button 51 and a flanged retainer plug 56. The retainer plug 56 abuts the lower end of an adjustable screw 57 threaded in a boss 60 on the valve cap 46 and may include a lock nut 58. A flattened thumb section 61 on the upper end of the screw 57 permits the screw to be turned easily, thus permitting adjustment of my device to open and close as the engine load varies. The upper chamber 42 may communicate with the atmosphere.

It will be understood that the degree of vacuum developed in the intake manifold between the cylinder valves and the carburetor throttle valve varies with the condition of the engine and drops as the engine wears. When in good condition, vacuum on the order of fifteen inches or more of water will be developed by an idling engine. To idle properly, the speed of air through the carburetor should be maintained, so the screw 57 is adjusted to permit the spring 55 to seat the valve 61 when the engine is idling. As the load on the engine is increased, the manifold vacuum falls, reducing the vacuum in the chamber 41 and permitting the spring 62 to unseat the valve 61, thus establishing a vacuum in the container 16 and drawing air through the tube 36 and the aerator 27.

Under very heavy load, a rich engine mixture is desirable. Therefore, when the vacuum drops to say four inches of water, the spring 62 shuts the valve 54 and maintains it in this position until the vacuum increases.

Since the degree of vacuum at which the valve 54 should seat is relatively fixed for all engines, the only adjustment required is with respect to the vacuum produced when the engine is idling, and this is obtained by movement of the screw 57 for any engine condition.

When the valves 54 and 61 are open, air passes through the opening 35, tube 36 and aerator 27, bubbling up through the water in the container 16 through the openings 38—38. This saturates the air with water vapor and gradually evaporates the water, which concentrates the dissolved salts in the water until they finally precipitate, together with the sediment in the water and may be periodically removed. The saturated air passes through the port 53 into chamber 41, through tube 22 and adapter 23 into the intake manifold 10 for mixture with the fuel-air mixture.

The rate at which water is evaporated depends not only upon the operating conditions of the engine, but also upon the relative humidity of the air passing through my device, since obviously dry air will evaporate much more water than damp or saturated air. Compensation for variations in the relative humidity of the air is therefore automatic.

It will be understood that if desired a pair of adapters 23 may be employed for carburetors having twin barrels, and may be connected to the same or separate humidifiers 15. Although I prefer to install the adapter immediately below the throttle valve of each carburetor barrel, it may be mounted in other positions from which an even distribution of vapor through the manifold is obtained. I may also incorporate various additives, such as water-soluble salts, esters, alcohols, or the like in the water in the container 16 to prevent freezing or to condition the engine.

Referring to Figure 4 of the drawings, it will be seen that the humidifier 15 may be located at any one of several positions within the engine compartment as indicated by the alternate positions, a, b, and c. It may also be mounted on the motor itself.

It will be obvious to those skilled in the art that a number of modifications other than those suggested and mentioned may be made in the foregoing embodiment of the invention, and that additional embodiments may be made without departing from the spirit and scope of the invention. Accordingly, all matter set forth above or shown in the accompanying drawings is to be interpreted as illustrative and not in a limiting sense.

I claim:

1. Apparatus for increasing the humidity of air passing into a zone of variable sub-atmospheric pressure comprising a water container, a cap for sealing the container and defining an inlet tube opening and a valve passage for connecting the interior of the container with an external valve chamber formed in the cap, said valve chamber having an outlet connectable to a source of variable sub-atmospheric pressure and an open side opposite the valve passage, an inlet tube extending from below water level in the container to the inlet opening, a valve stem in the valve passage, opposed valves on the stem for sealing the passage, a diaphragm sealed across the open side of the chamber and secured to one of the valves, opposed springs on opposite sides of the diaphragm, and means for varying the pressure of one of the springs.

2. The structure defined in claim 1 in which the inlet tube extends downwardly to a substantially horizontal spiral tubular coil in the lower extremity of the container, said coil having formed therein a multiplicity of perforations for passing air from the inlet tube upwardly through water in the container.

3. The structure defined in claim 1, wherein the means for varying pressure of one of the springs includes a bonnet extending over the diaphragm and around the spring and a screw threaded through the bonnet and engaging an end of the spring, the opposite end of said spring acting against the diaphragm.

4. Apparatus for increasing the humidity of air passing into a zone of variable sub-atmospheric pressure comprising a liquid container, a cap for sealing the container, said cap defining an inlet tube opening and a valve passage for connecting the interior of the container with an external valve chamber formed in the cap, said valve chamber having an outlet connectable to a source of variable sub-atmospheric pressure and an open side, an inlet tube extending from below water level in the container to the inlet opening, a rigid valve stem in the valve passage, opposed valves secured in spaced opposed relation on the stem for opening and closing said passage as the valve stem is reciprocated therein, a diaphragm sealed across the open side of the valve chamber opposite the valve passage and secured to one of said valves, and a spring in the chamber for urging the diaphragm outwardly away from the valve passage.

JAMES T. STONE.

REFERENCES CITED

The following references are of record in the file of this patent:

UNITED STATES PATENTS

| Number | Name | Date |
|---|---|---|
| 1,119,042 | Ricketts | Dec. 1, 1914 |
| 1,305,944 | Smith | June 3, 1919 |
| 1,312,948 | Bushey | Aug. 12, 1919 |
| 1,485,497 | Emerson | Mar. 4, 1924 |
| 1,578,216 | Stutika | Mar. 23, 1926 |
| 1,728,916 | Bone | Sept. 24, 1929 |
| 1,781,356 | West | Nov. 11, 1930 |
| 1,856,300 | Van Tuyl | May 3, 1932 |
| 2,073,887 | Strancke | Mar. 16, 1937 |
| 2,204,277 | Leigh | June 11, 1940 |